United States Patent
Nihei et al.

(10) Patent No.: US 7,577,500 B2
(45) Date of Patent: Aug. 18, 2009

(54) WHEEL INFORMATION-ACQUIRING SYSTEM AND WHEEL INSTALLATION POSITION INFORMATION-SETTING DEVICE

(75) Inventors: Hideki Nihei, Kanagawa (JP);
Toshimitsu Ebinuma, Kanagawa (JP);
Takahide Kitami, Kanagawa (JP);
Tomohiro Maruyama, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 489 days.

(21) Appl. No.: 10/553,043

(22) PCT Filed: Apr. 14, 2004

(86) PCT No.: PCT/JP2004/005299

§ 371 (c)(1),
(2), (4) Date: Apr. 27, 2006

(87) PCT Pub. No.: WO2004/091941

PCT Pub. Date: Oct. 28, 2004

(65) Prior Publication Data

US 2007/0055411 A1    Mar. 8, 2007

(30) Foreign Application Priority Data

Apr. 14, 2003  (JP)  ............................ 2003-109565

(51) Int. Cl.
*G01M 17/00* (2006.01)
(52) U.S. Cl. .................. 701/1; 701/2; 701/29
(58) Field of Classification Search ............ 701/1–2, 701/29, 36
See application file for complete search history.

(56) References Cited

U.S. PATENT DOCUMENTS 6,499,343 B1 * 12/2002 Haas et al. ................. 73/146
6,604,416 B2 * 8/2003 Tsujita ..................... 73/146.5
6,965,306 B2 * 11/2005 Tsujita et al. .............. 340/448

(Continued)

FOREIGN PATENT DOCUMENTS

CN    1141613 A    1/1997

(Continued)

*Primary Examiner*—Yonel Beaulieu
(74) *Attorney, Agent, or Firm*—Knobbe Martens Olson & Bear LLP

(57) ABSTRACT

A wheel information-acquiring system (10) sends wheel information, such as a tire inner pressure, together with preset identification information from a transmitter provided on a wheel installed on a motor vehicle and causes a receiver to receive the transmitted information.

In the wheel information-acquiring system, a setting device (60) transmits by wireless an ID, which the setting device is causing a transmitter (16a) to set, to the transmitter (16a) and causes the transmitter (16a) to set the ID. The setting device then transmits by wireless this ID and wheel installation position information, which is separately set and input, to the receiver, causing the receiver to map the ID and the wheel installation position information and then set and register the result of the mapping. The setting device also can acquire an ID unique to the transmitter (16a) and transmit the ID and wheel installation position information to the receiver. The structure makes it possible that the installation position of a wheel having wheel information received by the receiver is reliably specified. Thus the system with excellent durability and the wheel installation position information-setting device that realizes the system are provided.

19 Claims, 3 Drawing Sheets

U.S. PATENT DOCUMENTS 7,248,953 B2 * 7/2007 Ogawa ................. 701/29

FOREIGN PATENT DOCUMENTS

| | | |
|---|---|---|
| JP | 03-104715 | 5/1991 |
| JP | 312311 | 8/1995 |
| JP | 2639856 | 6/1996 |
| JP | 11-240315 | 9/1999 |
| JP | 11-254926 | 9/1999 |
| JP | 2000-182164 | 6/2000 |
| JP | 2001-056263 | 1/2001 |
| JP | 2001-322411 | 11/2001 |
| JP | 2003-002019 | 1/2003 |
| JP | 2003-028151 | 1/2003 |
| JP | 2003-139155 | 5/2003 |
| JP | 2003-182324 | 7/2003 |
| JP | 2003-223692 | 8/2003 |
| JP | 2003-242585 | 8/2003 |
| JP | 2003-276410 | 9/2003 |
| JP | 2003-291615 | 10/2003 |
| JP | 2004-009859 | 1/2004 |
| JP | 2004-009923 | 1/2004 |
| JP | 2004-017909 | 1/2004 |
| JP | 2004-216930 | 8/2004 |
| WO | WO 95/22467 | 8/1995 |
| WO | WO 02/057098 A1 | 7/2002 |

* cited by examiner

WHEEL INFORMATION-ACQUIRING SYSTEM AND WHEEL INSTALLATION POSITION INFORMATION-SETTING DEVICE This application is the U.S. National Phase under 35 U.S.C. §371 of International Application PCT/JP2004/005299, filed Apr. 14, 2004, which claims priority to Japanese Patent Application No. 2003-109565, filed Apr. 14, 2003. The International Application was not published under PCT Article 21(2) in English.

TECHNICAL FIELD

The present invention relates to a wheel information-acquiring system for transmitting, by radio, wheel information to a vehicle body, the wheel information regarding a wheel of a vehicle having at least four wheels such as a truck, a bus, or a passenger car, or various vehicles such as a two-wheeled vehicle, for example, inner pressure data and temperature data of a tire, and relates to a wheel installation position information-setting device used for this acquiring system.

BACKGROUND ART

In today's world, in various vehicles having wheels such as a truck, a bus, a passenger car, and a motor cycle where tires are assembled in rims, there has been proposed installation of a tire inner pressure alarm system which always monitors tire inner pressure and notifies abnormalities of the tire inner pressure when necessary.

According to the tire inner pressure alarm system, for example, in a tire cavity area surrounded with an inner peripheral surface of the tire and a bottom surface of a rim bottom portion and filled with air, there are disposed a pressure sensor for measuring inner pressure, and a transmitter for transmitting inner pressure data measured by this pressure sensor by radio. Additionally, in the tire house vicinity of a vehicle body side, there is disposed an antenna of a receiver for receiving the inner pressure data, and the inner pressure data is received by this antenna. At the receiver, whether the tire inner pressure is abnormal or not is always monitored. In the case of an abnormality, a driver is notified of the inner pressure abnormality.

In this case, when the inner pressure data is transmitted from the transmitter to the receiver, a unique identification signal held by the transmitter is transmitted to the receiver, and the receiver can know which transmitter has transmitted the inner pressure data. Additionally, at the receiver, identification information of the receiver and wheel installation position information (information regarding right front wheel, right rear inner wheel, right rear outer wheel, left front wheel, left rear inner wheel, or left rear outer wheel) are correlated with each other to be registered in advance. The wheel installation position information is obtained from the identification information transmitted together with the inner pressure data by referring to a result of the correlation. Accordingly, it is possible to know the installation position of the wheel from which the inner pressure data has been transmitted.

On the other hand, for the tire assembled to the wheel, to prevent shortening of a tire life caused by uneven wear of a tire tread portion, so-called wheel rotation including the tire is carried out to change the wheel installation position for each specified traveling kilometers of the vehicle or according to need. In this case, as the transmitter is disposed in the tire cavity area to be fixed, during the wheel rotation, the wheel is. fixed to another installation position while the transmitter remains fixed. Thus, to correlate the identification information of the transmitter with the installation position of the wheel actually fixed to the vehicle after the rotation, correct installation position information after a change of a mounting position of the wheel must be provided to the receiver.

JP 3212311 B (Patent Document 1) and JP 2639856 B (Patent Document 2) each disclose a device for monitoring air pressure in tire and a remote tire pressure monitoring system.

The tire air pressure monitoring device disclosed in Patent Document 1 includes a pressure measuring device which is a pressure sensor, a transmission device which is a transmitter, and a receiver, and setting of correct installation information after wheel rotation is carried out in a paring mode (lines 8 to 42 in column 15 of Patent Document 1).

In the pairing mode of Patent Document 1, for example, each receiver disposed in the vicinity of an installation position of each wheel receives a signal having the maximum signal strength among signals transmitted from a plurality of transmitters. Thus, by correlating identification information unique to the transmitter contained in the received signal with an installation position corresponding to an installation position of the receiver which has received the signal, the identification information and a wheel installation position can be correlated with each other (lines 8 to 18 in column 15 of Patent Document 1). Moreover, by manually changing inner pressure for each wheel while checking to find inner pressure data having an identification signal which matches this inner pressure change at the receiver, the corresponding identification signal and the wheel installation position can be correlated with each other (lines 30 to 42 in column 15 of Patent Document 1).

On the other hand, according to Patent Document 2, the system includes a pressure sensor for detecting pressure, transmitting means which is a transmitter, and receiving means for receiving a signal, and a magnetic operation switch is mounted to the transmitting means. Further, the magnetic operation switch of the transmitting means is operated by moving a strong magnet near the wheel position to transmit a learning mode signal from the transmitting means to the receiving means. Accordingly, the wheel installation position is correlated with the receiving means (lines 6 to 13 in column 3 and lines 10 to 31 in column 11 of Patent Document 2).

Incidentally, in the pairing mode of Patent Document 1, at the receiver arranged in the vicinity of each wheel, correlation is carried out on the assumption that a signal having the maximum signal strength is a signal transmitted from the transmitter closest to the receiver. In many cases, however, a result of the correlation obtained in the pairing mode is not always correct. As the transmitter is mounted to a rotating rim or tire, directional property of a radio wave emitted when the transmitter transmits a signal causes a change in strength of the signal received by the receiver depending on the circumferential position of the transmitter around the rim in the pairing mode. Thus, in the paring mode implemented in a stationary state where traveling of the vehicle is stopped, the signal received by the receiver may not be a signal from the transmitter closest to each receiver but a signal from a transmitter disposed in each of adjacently installed wheels as in the case of a truck vehicle.

Reliable correlation is possible by checking to find an identification signal which matches the change of the inner pressure at the receiver while the tire inner pressure is manually changed with respect to each wheel. However, this is time-consuming troublesome work. Thus, working efficiency is low in a vehicle production line, causing a problem of a reduction in production efficiency. Further, also during wheel rotation, in the case of a large truck vehicle having a large number of wheels such as 12, work is troublesome because inner pressure is manually changed for each wheel.

According to Patent Document 2, the transmitting means includes the magnetic operation switch. Thus, when this transmitting means is mounted to a rotating wheel, the transmitting means is easily damaged by vibration or a centrifugal force which accompanies the rotation of the wheel, causing a problem of deterioration of durability.

Therefore, to solve the foregoing problems, an object of the present invention is to provide a highly durable wheel information-acquiring system capable of surely knowing from which wheel wheel information regarding a wheel received by a receiver has been transmitted and having no contact point such as a magnetic operation switch, and a wheel installation position information-setting device used for this acquiring system.

DISCLOSURE OF THE INVENTION

To achieve the above-mentioned object, according to the present invention, there is provided a wheel information-acquiring system which includes: a first communication device disposed in a wheel to transmit by radio wheel information regarding the wheel together with identification information that the first communication device holds by radio; and a second communication device disposed in a vehicle body in which the wheel is installed to receive the wheel information and the identification information transmitted from the first communication device, the wheel information-acquiring system including a setting device that acquires the identification information held by the first communication device, transmits by radio the identification information and installation position information set and input of the wheel in the vehicle body to the second communication device, and causes the second communication device to correlate the identification information and the installation position information with each other and to set and register a result of the correlation, wherein the second communication device refers to the result of the correlation to acquire an installation position of the wheel having the wheel information in the vehicle body from the identification information which is transmitted from the first communication device and is received together with the wheel information.

Here, it is preferable that: the setting device make an inquiry by radio about the identification information that the first communication device holds to the first communication device; and the first communication device return by radio the identification information that the first communication device holds to the setting device to allow the setting device to acquire the identification information of the first communication device.

The wheel information is, for example, measurement data measured by a sensor connected to the first communication device. The sensor includes, for example, at least one of a tire inner pressure sensor fixed to the wheel and a temperature sensor installed in the wheel.

In this case, it is preferable that: the first communication device be disposed in each of front and rear wheels; and a receiver of the second communication device be disposed in the vicinity of the first communication device at least separately in each of the front and rear wheels.

Further, according to the present invention, there is provided a wheel information-acquiring system which includes: a first communication device disposed in a wheel to transmit wheel information regarding the wheel by radio; and a second communication device disposed in a vehicle body in which the wheel is installed to receive the wheel information transmitted from the first communication device, the wheel information-acquiring system including a setting device that transmits by radio identification information to be set by the first communication device by radio to the first communication device, causes the first communication device to set the identification information, transmits by radio the set identification information and installation position information set and input of the wheel in the vehicle body to the second communication device, and causes the second communication device to correlate the identification information and the installation position information with each other and to set and register a result of the correlation, wherein the first communication device transmits the set identification information together with the wheel information to the second communication device; and the second communication device refers to the result of the correlation to acquire an installation position of the wheel having the wheel information in the vehicle body from the identification information received together with the wheel information.

Here, the wheel information is, for example, measurement data measured by a sensor connected to the first communication device. The sensor includes at least one of a tire inner pressure sensor fixed to the wheel and a temperature sensor installed in the wheel.

In this case, it is preferable that: the first communication device be disposed in each of front and rear wheels; and a receiver of the second communication device be disposed in the vicinity of the first communication device at least separately in each of the front and rear wheels.

Further, according to the present invention, there is provided a setting device of vehicle installation position information used for causing a second communication device disposed in the vehicle body in which the wheel is installed to acquire an installation position of the wheel having wheel information in the vehicle body when the wheel information regarding the wheel is transmitted by radio from a first communication device disposed in the wheel together with identification information that the first communication device holds, and the second communication device receives the transmitted wheel information and the identification information, wherein an inquiry is made by radio about the identification information held by the first communication device to the first communication device, and the identification information returned from the first communication device in response to the inquiry is transmitted together with set and input installation position information of the wheel by radio to the second communication device to cause the second communication device to correlate the identification information and the installation position information with each other and to set and register a result of the correlation.

Further, according to the present invention, there is provided a setting device of vehicle installation position information used for causing a second communication device disposed in a vehicle body in which a wheel is installed to acquire an installation position of the wheel having wheel information in the vehicle body, when the wheel information regarding the wheel is transmitted by radio from a first communication device disposed in the wheel together with set identification information, and the second communication device receives the transmitted wheel information and the identification information, wherein identification information to be set by the first communication device is transmitted by radio to the first communication device to cause the first communication device to set the identification information, and the set identification information and installation position information set and input of the wheel are transmitted by radio to the second communication device to cause the second communication device to correlate the identification information and the installation position information with each other and to set and register a result of the correlation.

According to the present invention, by using the wheel installation position information-setting device completely independent of the transmitter and the receiver, the correlation of the ID with the wheel installation position information is carried out by the receiver. Thus, it is possible to surely know from which wheel the wheel information regarding the wheel has been transmitted, the information transmitted from the transmitter and received by the receiver. Besides, there is no contact point such as a magnetic operation switch, so it is possible to configure a highly durable system.

BEST MODES FOR CARRYING OUT THE INVENTION

Hereinafter, a wheel information-acquiring system and a wheel installation position information-setting device of the present invention will be described in detail based on preferred embodiments shown in accompanying drawings.

Figure 1:
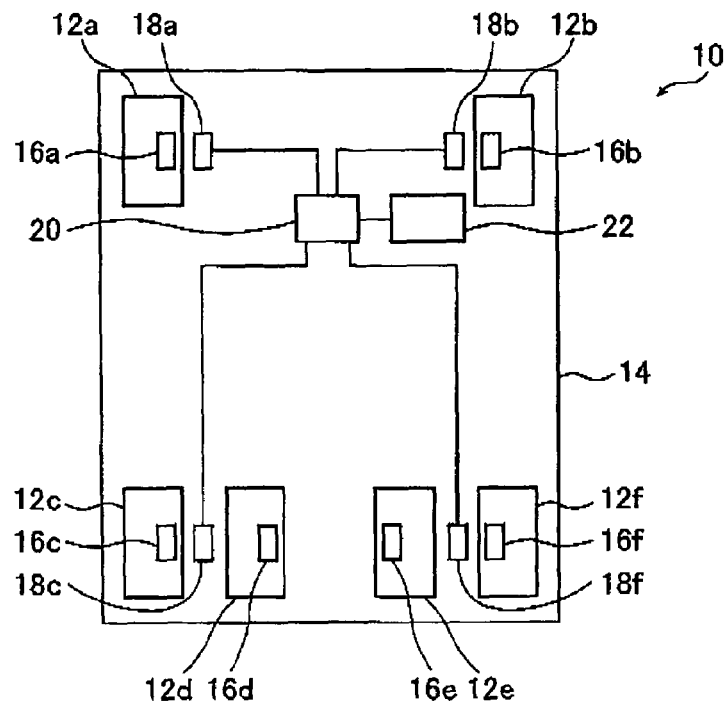
FIG. 1 is a schematic block diagram showing an inner pressure information-acquiring system which is an embodiment of a wheel information-acquiring system of the present invention.

FIG. 1 shows a tire inner pressure monitoring system (referred to as a system, hereinafter) 10 of a truck vehicle which is an example of the wheel information-acquiring system.

As shown in FIG. 1, wheels 12a to 12f constituting an assembly of a tire and a rim are fixed in wheel installation positions of a truck vehicle 14, respectively.

In tire cavity areas of the wheels 12a to 12f, transmitters (first communication devices) 16a to 16f that transmit measured inner pressure data by radio are installed and fixed on a bottom surface of a rim bottom which becomes a wall surface of these areas. Further, the transmitters 16a to 16f are connected to a pressure sensor and a temperature sensor.

Further, in the vicinity of a tire house of the installation positions of the wheels 12a to 12f in the vehicle body of the truck vehicle 14, there are disposed receiver communication portions 18a to 18f having antennas and amplifiers for receiving information transmitted by radio from the transmitters 16a to 16f. The receiver communication portions 18a to 18f are connected by wire to one receiver body portion 20. Further, the receiver body portion 20 is connected to a display device 22 for displaying inner pressure data for a driver of the truck vehicle 14. In addition to transmission functions of transmitting mainly the inner pressure data and temperature data, the transmitters 16a to 16f have reception functions of receiving predetermined signals. A second communication device of the present invention is a receiver configured by including the receiver communication portions (reception portions) 18a to 18f and the receiver body portion 20.

In FIG. 1, the receiver communication portion 18c receives signals transmitted from the transmitters 16c and 16d, and the receiver communication portion 18f receives signals transmitted from the transmitters 16e and 16f.

Figure 2:
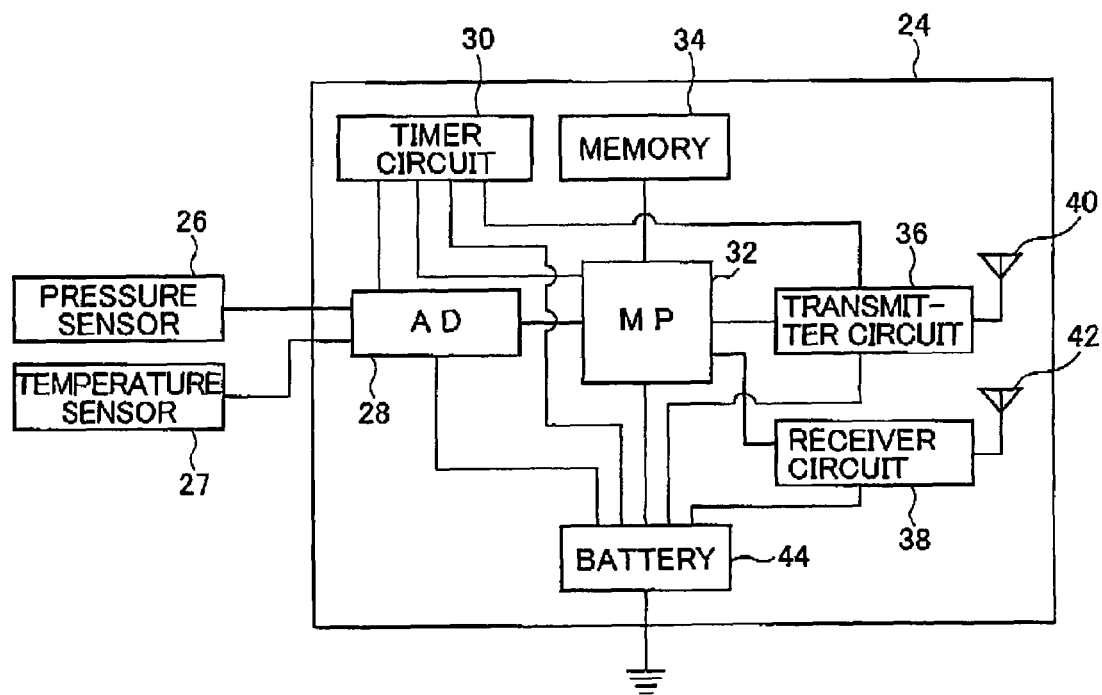
FIG. 2 is a schematic block diagram showing an example of a transmitter used in the inner pressure information-acquiring system shown in FIG. 1.

As the transmitters 16b to 16f are similar in configuration to the transmitter 16a, the transmitter 16a will be described as a representative of the transmitters 16a to 16f, and description of the transmitters 16b to 16f will be omitted. FIG. 2 is a schematic block diagram showing the transmitter 16a.

The transmitter 16a includes circuits disposed in a circuit board 24, and is connected to a pressure sensor 26 for measuring tire inner pressure and a temperature sensor 27.

The pressure sensor 26 is a semiconductor pressure sensor or an electric capacitance type pressure sensor for measuring gauge pressure, differential pressure or absolute pressure, and measures the tire inner pressure. The temperature sensor 27 is a semiconductor temperature sensor or a resistive element type temperature sensor, and measures a temperature in the tire cavity area. The pressure sensor 26 and the temperature sensor 27 are connected to an AD conversion circuit 28 described later.

The circuit board 24 includes an AD conversion circuit (AD) 28, a timer circuit 30, a microprocessor (MP) 32, a memory 34, a transmitter circuit 36, a receiver circuit 38, a transmission antenna 40, a reception antenna 42, and a battery 44 as a power source for each circuit.

The AD conversion circuit 28 is connected to the pressure sensor 26 and the temperature sensor 27, and is a portion to convert the pressure data measured by the pressure sensor 26 or the temperature data measured by the temperature sensor 27 into a digital signal of, e.g., 8 bits.

The timer circuit 30 measures the tire inner pressure and the temperature at fixed time intervals, e.g., every 15 minutes, when the tire inner pressure is normal (when the inner pressure is within a preset permissible range). The timer circuit 30 manages a measuring time interval and a transmitting time interval for repeatedly transmitting the inner pressure data and the temperature data from the transmission antenna 40 to the receiver communication portion 18a at fixed time intervals, e.g., at intervals of one hour. The timer circuit 30 may include a dedicated circuit or may be programmed by the MP 32. Large driving power is necessary when the AD conversion circuit 28, the MP 32, and the transmitter circuit 36 are constantly driven. Accordingly, they are driven at fixed time intervals when the tire inner pressure is normal. Otherwise, a sleep mode is set to stop processing or transmission of the transmitter 16a. Thus, consumption of the battery 44 is reduced, thereby making it possible for the transmitter 16a to monitor the tire inner pressure for a long time. Needless to say, when it is determined that the tire inner pressure is out of the preset permissible range to be abnormal, the measuring time interval and the transmitting time interval are changed to be shorter.

The MP 32 generates a transmission signal to be transmitted to the receiver communication portion 18a by using: the inner pressure data and the temperature data subjected to an AD conversion and supplied by the AD conversion circuit 28; and identification information (ID) of the transmitter 16a discriminated from the other transmitters 16b to 16f and a word signal called from the memory 34. Additionally, the MP 32 stores and holds a new ID in the memory 34 according to a signal supplied from the receiver circuit 38 as described later, and controls and manages the operation of each circuit. The transmission signal generated by the MP 32 is a signal generated such that signals of a predetermined format repeatedly continue. The ID and the word signal are signals where 0 and 1 of specific bit numbers are continuously arranged on the basis of a predetermined rule. The word signal is a signal where, for example, 3 blocks each having 0 arranged by 10 bits and then 1 arranged by 10 bits are repeatedly arranged.

The memory 34 can store the measured inner pressure data and the temperature data in addition to the ID of the transmitter 16a.

The transmitter circuit 36 includes an oscillation circuit (not shown) for generating a carrier wave of a predetermined frequency such as 315 MHz, a modulation circuit (not shown) for generating a radiofrequency signal of a carrier wave modulated according to the transmission signal generated by the MP 32, and an amplifier circuit (not shown) for amplifying the radiofrequency signals. In this case, as a modulation system of the carrier wave, one of the following well-known systems may be used: an amplitude shift keying (ASK) system, a frequency shift keying (FSK) system, a phase shift keying (PSK) system, a multivalued PSK system such as a QPSK or an 8-layer PSK, and a multivalued ASK system such as 16 QAM or 64 QAM.

The receiver circuit 38 receives a signal transmitted from a setting device described later to supply it to the MP 32. The receiver circuit 38 includes a full-wave rectifier circuit which operates itself by using power for rectifying the received signal as driving power, then supplies the power to drive the MP 32, and demodulates the signal to supply it to the MP 32.

The received signal contains an ID which was input and set at the setting device. The received signal is supplied to the MP 32, the ID contained in the signal supplied to the MP 32 is extracted. Then, this ID is stored and held as a new ID of the transmitter 16a in the memory 34. Upon completion of the storing and holding, at the MP 32, a signal of information to the effect that the new ID has been stored and held in the memory 34 is generated, and returned from the transmitter circuit 36 to the setting device.

The antenna 40 is configured to emit a radio wave of, e.g., 315 MHz, to the receiver communication portion 18a and the setting device. The antenna 42 is configured to receive a radio wave of, e.g., 125 kHz, from the setting device. There is an extremely large difference in operation frequencies which are radio wave operation conditions between the antennas 40 and 42, the antennas 40 and 42 are configured separately to efficiently transmit and receive signals.

For the battery 44, a well-known battery such as a coin-shaped manganese dioxide lithium battery (CR-2032) is used.

The transmitter 16a is configured as described above.

Figure 3:
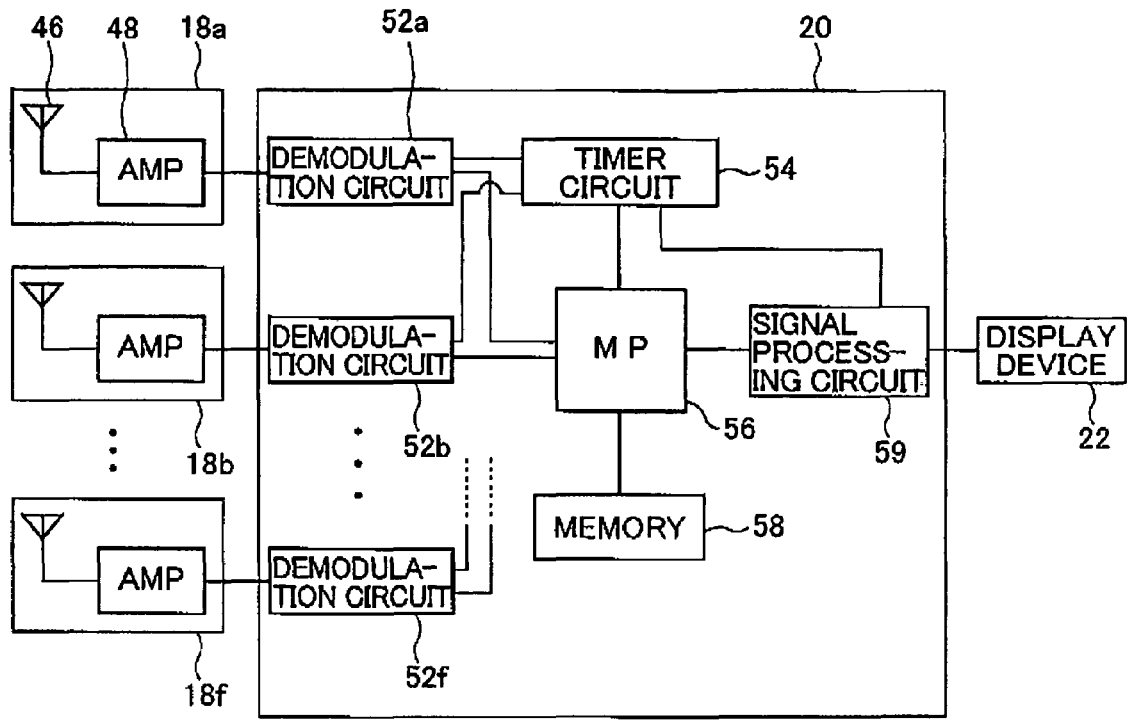
FIG. 3 is a schematic block diagram showing a receiver of the inner pressure acquiring system shown in FIG. 1.

FIG. 3 is a block diagram showing the receiver body portion 20, and the receiver communication portions 18a, 18b, . . . , 18f connected to the receiver body portion 20.

The receiver communication portions 18a to 18f are similar in configuration to one another. Thus, the receiver communication portion 18a will be described as a representative.

The receiver communication portion 18a includes an antenna 46 and an amplifier circuit (AMP) 48. The antenna 46 is configured to receive a radio wave of, e.g., 315 MHz, transmitted from the transmitter 16a. The amplifier circuit 48 is configured by using a field effect transistor (FET) or the like, and amplifies a received radiofrequency signal and supplies it to the receiver body portion 20.

The receiver body portion 20 demodulates radiofrequency signals supplied from the receiver communication portions 18a to 18f into transmission signals to extract the inner pressure data, the temperature data, and the ID, determines from the extracted ID, from which installation position of the tire the inner pressure data and the temperature data have been transmitted by refereing the preset and registered result of correlation, and monitors the inner pressure by using the inner pressure data temperature-corrected by using the tire temperature data for each acquired installation position information. For example, temperature-corrected inner pressure data of a tire of a right front wheel is compared with a predetermined set value to categorize an inner pressure state into, e.g., 3 stages of "normal", "caution", and "alarm". A result of the categorization is supplied to the display device 22 connected to the receiver body portion 20. The display device 22 displays a value of the temperature-corrected inner pressure data for each vehicle installation position. In this case, the display device 22 displays a numerical value of inner pressure, and a categorized inner pressure state ("normal", "caution", or "alarm") on an instrument panel of the truck vehicle 14.

The receiver body portion 20 is configured by including demodulation circuits 52a to 52f for demodulating signals from the radiofrequency signals supplied from the receiver communication portions 18a to 18f, a timer circuit 54, an MP 56, a memory 58, and a signal processing circuit 59.

Each of the demodulation circuits 52a to 52f generates a demodulated signal with well-known filtering processing and signal code correction processing, and supplies the demodulated signal to the MP 56. The timer circuit 54 is used for switching the receiver body portion 20 from a sleep mode to a driving mode for a fixed time at fixed time intervals to drive the MP 56, the demodulation circuits 52a to 52f, and the signal processing circuit 60. As a power source, a battery (not shown) of the truck vehicle 14 is used. Alternatively, a battery incorporated in the receiver body portion 20 may be used.

The MP 56 acquires an ID, inner pressure data, and temperature data from the signal supplied from each of the demodulation circuits 52a to 52f, and refers to correlation data between an ID and installation position information of the wheel set to be stored and held in the memory 58 to determine from the acquired ID a tire of wheel where the inner pressure data and the temperature data come from.

The memory 58 sets and registers data of correlation between the ID and the installation position information, which are set by the setting device described later, to store and hold the same.

The signal processing circuit 59 is connected to the MP 56, corrects the inner pressure data for temperature compensation by using the supplied temperature data, and generates a signal matching a display device 50 from the temperature-compensated inner pressure data.

The receiver communication portions 18a to 18f and the receiver body portion 20 are configured as described above.

As described above, the ID of the transmitter 16a can be set by an independent setting device 60 (see FIG. 4) separately from the transmitters 16a to 16f and the receiver body portion 20.

Figure 4:
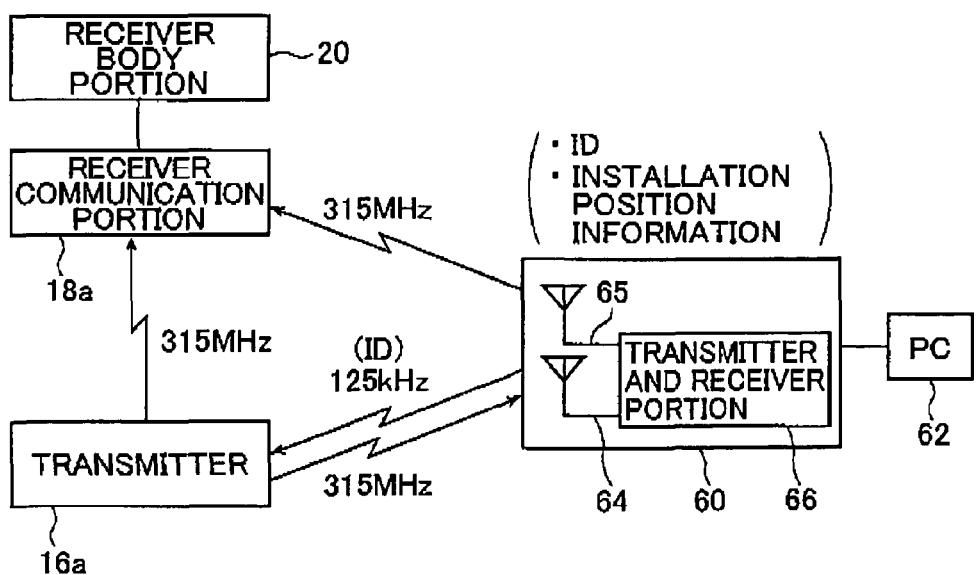
FIG. 4 is an explanatory diagram showing an example of an operation of a setting device used for the wheel information-acquiring system of the present invention.

FIG. 4 is a diagram for explaining communication carried out by the setting device 60 with the transmitter 16a and the receiver communication portion 18a. Communication operations that the setting device 60 carries out with the transmitters 16a to 16f and the receiver communication portions 18a to 18f are all similar. Thus, hereinafter, communication of the setting device 60 with the transmitter 16a and the receiver communication portion 18a will be representatively described.

The setting device 60 is configured by including antennas 64 and 65, and a transmitter and receiver portion 66 for: modulating a carrier wave of a predetermined frequency by a transmission signal supplied from a personal computer (PC) 62 to generate a radiofrequency signal; amplifying this radiofrequency signal to supply it to the antenna 64 or 65; demodulating a signal received by the antenna 65 to acquire a demodulated signal; and supplying this signal to the PC 62.

The antenna 64 is configured to emit a radio wave of, e.g., 125 KHz, to be transmitted to the transmitter 16a, and the antenna 65 is configured to receive a radio wave of, e.g., 315 MHz, returned from the transmitter 16a, and emit a radio wave of, e.g., 315 MHz, to be transmitted to the receiver communication portion 18a.

The setting device 60 thus configured operates as follows.

The setting device 60 is connected to the PC 62, and upon manual inputting of an ID to be set for the transmitter 16a at the PC 62, a signal containing the ID to be transmitted to the transmitter 16a is generated at the PC 62, and supplied to the transmitter and receiver portion 66. FIG. 4 is a diagram for explaining an operation of the setting device 60 when an ID is set and the ID is correlated with installation position information by using the setting device 60.

At the transmitter and receiver portion 66, for example, a carrier wave of 125 kHz is generated, and modulated by the generated signal containing the ID to generate a radiofrequency signal, and a radio wave is emitted from the antenna 64 to the transmitter 16a.

At the transmitter 16a, when the radio wave from the antenna 64 is received by the antenna 42 to generate a radiofrequency signal, a part of the radiofrequency signal supplied to the receiver circuit 38 is rectified to generate driving power, thereby driving the receiver circuit 38 and the MP 32. At the receiver circuit 38, the signal containing the ID is reproduced from the supplied radiofrequency signal to be supplied to the MP 32.

After the reproduced signal containing the ID has been supplied to the MP 32, the ID is extracted from this signal at the MP 32, and this ID is set as a new ID assigned to the transmitter 16a to be stored and held in the memory 34. Upon completion of the storing and holding, the MP 32 generates a signal of information to the effect that the new ID has been stored and held in the memory 34, and the signal is returned from the transmitter circuit 36 to the setting device 60 by a radio wave of, e.g., 315 MHz.

In the setting device 60, the signal received through the antenna 65 is demodulated at the transmitter and receiver portion 66 to be supplied to the PC 62. At the PC 62, upon reception of this signal, manually-input installation position information of the wheel in the truck vehicle 14 and a signal containing an ID stored and held in the memory 34 are generated to be supplied to the transmitter and receiver portion 66. At the transmitter and receiver portion 66, a carrier wave of, for example, 315 MHz is modulated by the signal generated at the PC 62, and a radio wave is emitted from the antenna 65 to the receiver communication portion 18a.

At the receiver communication portion 18a, the radio wave is received through the antenna 46, and a radiofrequency signal amplified by the amplifier circuit 48 is supplied to the receiver body portion 20. At the receiver body portion 20, the signal is demodulated by the demodulation circuit 52a to be supplied to the MP 56.

At the MP 56, the ID contained in the demodulated signal and the installation position information are correlated with each other, which are set and registered to be stored and held in the memory 58.

As described above, the setting device 60 transmits the ID to be set for the transmitter 16a by radio to be set therefore and transmits by radio this set ID and the installation position information of the wheel 12a in the vehicle body which has been set and input from the PC 62, to the receiver communication portion 18a. Thereby, the receiver body portion 20 correlates the ID with the installation position information and sets and registers a result of the correlation.

The ID of each of the transmitters 16a to 16f respectively fixed to the wheels 12a to 12f set in the receiver body portion 20 and the installation position information are correlated with each other as described above. Thus, when the tire inner data and the temperature data are transmitted together with the ID from each of the transmitters 16a to 16f, the receiver body portion 20 refers to the result of the correlation stored and held in the memory 58 to know from the transmitted ID from which wheel the inner pressure data and the temperature come.

When the correlation of the ID and the installation position information is performed by using the setting device 60 in a process of installing wheels of the vehicle production line, the setting device 60 is moved near the wheel installation position, and a signal containing an ID to be set and input which has been manually input from the PC 62 is transmitted to each of the transmitters 16a to 16f to thereby set the ID. Further, this ID and the installation position information separately and manually input from the PC 62 are transmitted to the receiver body portion 20, to thereby cause the receiver body portion 20 to correlate the ID with the installation position information, and to set and register this result. In the case of executing a wheel rotation to change the wheel installation position, the wheel installation position information correlated with the ID can be similarly changed by using the setting device 60.

Particularly, in the setting device 60, the ID and the installation position information are input in a state where the wheel is installed in the truck vehicle 14 to thereby set the transmitters 16a to 16f and the receiver body portion 20. Thus, reliable correlation can be carried out in the vehicle production line or during the wheel rotation. Further, by automating the inputting of the installation position information from the PC 62, ID setting can be automatically executed by using the setting device 60, and the result of correlating the ID with the installation position information can also be set and registered. Thus, working efficiency and production efficiency can be enhanced during the manufacturing process or the wheel rotation.

Further, the radio wave is emitted from the setting device 60 to set an ID of each of the transmitters 16a to 16f. Then, the receiver body portion 20 sets and registers the result of correlating the ID of each of the transmitters 16a to 16f with the installation position information. Thus, unlike in the conventional case, it is possible to configure a highly durable transmitter having no contact point such as a magnetic operation switch. Besides, as response speeds of the setting and the correlation are fast, working efficiency and production efficiency are enhanced in a site of the manufacturing process for mass-producing vehicles.

Figure 5:
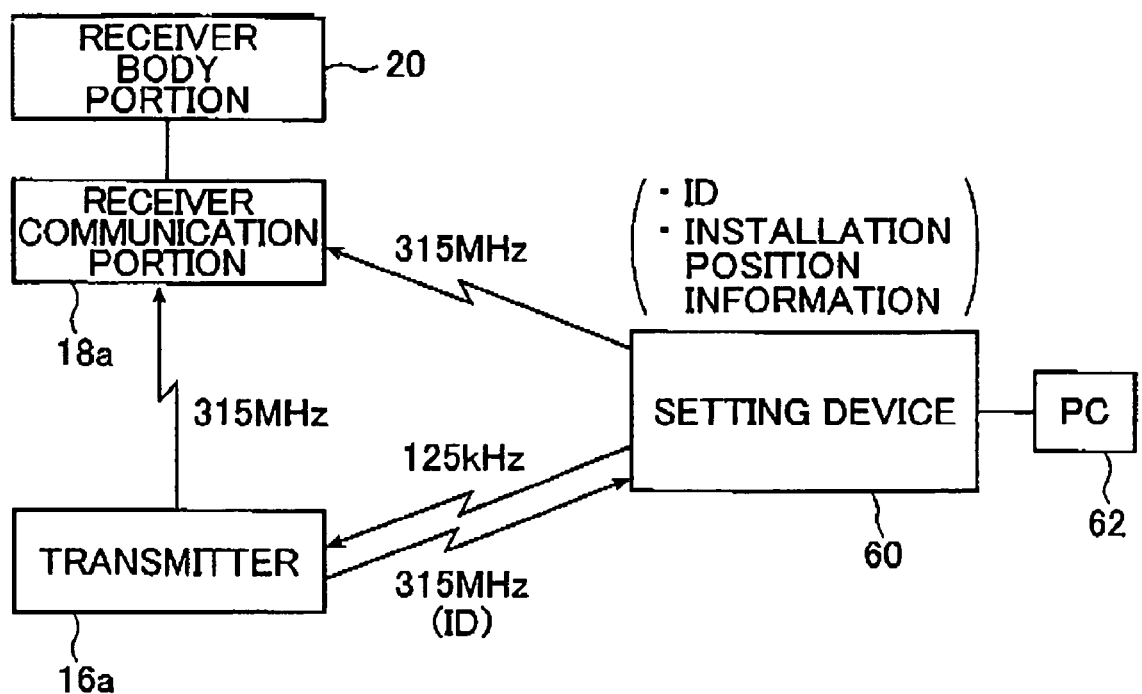
FIG. 5 is an explanatory diagram showing another example of the operation of the setting device used for the wheel information-acquiring system of the present invention.

According to the present invention, the ID unique to each of the transmitters 16a to 16f may be stored and held in the memory 34 in advance. In this case, as shown in FIG. 5, during the vehicle manufacturing process or the wheel rotation, in response to an ID inquiry from the setting device 60, the unique ID that has been stored and held is returned from the transmitter 16a to the setting device 60. The setting device 60 may be configured to transmit this returned ID and wheel installation position information separately input from the PC 62 to the receiver communication portion 18a to cause the ID and the installation position information of the wheel 12a to be correlated with each other, and to cause the receiver body portion 20 to set and register the result of this correlation in the memory 58 of the receiver body portion 20.

The embodiments have been described by way of example of the 6-wheel truck vehicle. However, the present invention can be applied to vehicles having at least two wheels. Further, in the above embodiments, the tire inner pressure and the temperature are to be wheel information. However, according to the present invention, the wheel information is not limited to this as long as the information is obtained by measuring a wheel state by a sensor.

The wheel information-acquiring system and the wheel installation position information-setting device of the present invention have been described above in detail. However, the present invention is not limited to the above embodiments. Needless to say, various improvements and changes can be made without departing from the spirit and scope of the present invention.

INDUSTRIAL APPLICABILITY

The present invention can be preferably applied to a wheel information-acquiring system for transmitting, by radio, wheel information regarding a wheel of a vehicle having at least four wheels such as a truck, a bus, or a passenger car, or various vehicles such as a two-wheeled vehicle, for example, inner pressure data and temperature data of a tire to a vehicle body. The present invention can be also preferably applied to a wheel installation position information-setting device used for this acquiring system.

The invention claimed is:

1. A wheel information-acquiring system which includes: a first communication device disposed in a wheel to transmit by radio wheel information regarding the wheel together with identification information that the first communication device holds; and a second communication device disposed in a vehicle body in which the wheel is installed to receive the wheel information and the identification information transmitted from the first communication device, the wheel information-acquiring system comprising a setting device that acquires the identification information held by the first communication device, transmits by radio the identification information and installation position information set and input of the wheel in the vehicle body to the second communication device, and causes the second communication device to correlate the identification information and the installation position information with each other and to set and register a result of the correlation, wherein the second communication device refers to the result of the correlation to acquire an installation position of the wheel having the wheel information in the vehicle body, from the identification information which is transmitted from the first communication device and is received together with the wheel information.

2. The wheel information-acquiring system according to claim 1, wherein the setting device makes an inquiry by radio about the identification information that the first communication device holds to the first communication device, and the first communication device returns by radio the identification information that the first communication device holds to the setting device to allow the setting device to acquire the identification information of the first communication device.

3. The wheel information-acquiring system according to claim 1, wherein the wheel information is measurement data measured by a sensor connected to the first communication device.

4. The wheel information-acquiring system according to claim 3, wherein the sensor includes at least one of a tire inner pressure sensor fixed to the wheel and a temperature sensor installed in the wheel.

5. The wheel information-acquiring system according to claim 1, wherein the first communication device is disposed in each of front and rear wheels, and a receiver of the second communication device is disposed in the vicinity of the first communication device at least separately from each of the front and rear wheels.

6. A wheel information-acquiring system which includes: a first communication device disposed in a wheel to transmit wheel information regarding the wheel by radio; and a second communication device disposed in a vehicle body in which the wheel is installed to receive the wheel information transmitted from the first communication device, the wheel information-acquiring system comprising a setting device that transmits by radio identification information to be set by the first communication device by radio to the first communication device, causes the first communication device to set the identification information, transmits by radio the set identification information and installation position information set and input of the wheel in the vehicle body to the second communication device, and causes the second communication device to correlate the identification information and the installation position information with each other and to set and register a result of the correlation, wherein the first communication device transmits the set identification information together with the wheel information to the second communication device; and the second communication device refers to the result of the correlation to acquire an installation position of the wheel having the wheel information in the vehicle body from the identification information received together with the wheel information.

7. The wheel information-acquiring system according to claim 6, wherein the wheel information is measurement data measured by a sensor connected to the first communication device.

8. The wheel information-acquiring system according to claim 7, wherein the sensor includes at least one of a tire inner pressure sensor fixed to the wheel and a temperature sensor installed in the wheel.

9. The wheel information-acquiring system according to claim 6, wherein the first communication device is disposed in each of front and rear wheels, and a receiver of the second communication device is disposed in the vicinity of the first communication device at least separately from each of the front and rear wheels.

10. A setting device of vehicle installation position information used for causing a second communication device disposed in a vehicle body in which a wheel is installed to acquire an installation position of the wheel having wheel information in the vehicle body when the wheel information regarding the wheel is transmitted by radio from a first communication device disposed in the wheel together with identification information that the first communication device holds, and the second communication device receives the transmitted wheel information and the identification information, wherein the setting device makes an inquiry by radio about the identification information held by the first communication device to the first communication device, and transmit the identification information returned from the first communication device in response to the inquiry together with set and input installation position information of the wheel by radio to the second communication device to cause the second communication device to correlate the identification information and the installation position information with each other and to set and register a result of the correlation.

11. A setting device of vehicle installation position information used for causing a second communication device disposed in a vehicle body in which a wheel is installed to acquire an installation position of the wheel having wheel information in the vehicle body, when the wheel information regarding the wheel is transmitted by radio from a first communication device disposed in the wheel together with set identification information, and the second communication device receives the transmitted wheel information and the identification information, wherein identification information to be set by the first communication device is transmitted by radio to the first communication device to cause the first communication device to set the identification information, and the set identification information and installation position information set and input of the wheel are transmitted by radio to the second communication device to cause the second communication device to correlate the identification information and the installation position information with each other and to set and register a result of the correlation.

12. A wheel information-acquiring system comprising:

a first communication device provided in a wheel installed on a motor vehicle for wirelessly outputting an ID unique to the wheel and wheel information including a tire inner pressure of the wheel;

a second communication device provided in a vehicle body of the motor vehicle for receiving the ID and the wheel information outputted from the first communication device; and a setting device storing the ID of the wheel and installation position information indicating the position of the wheel in the motor vehicle, said setting device configured to wirelessly transmit to the second communication device the ID and the installation position information and to cause the second communication device to register a relationship between the ID and the installation position information, wherein the second communication device is configured to correlate the wheel information with the installation position information based on the ID and the wheel information received from the first communication device and the registered relationship between the ID and the installation position information.

13. The wheel information-acquiring system according to claim 12, wherein the setting device is configured to acquire the ID wirelessly from the first communication device and store the ID.

14. The wheel information-acquiring system according to claim 12, wherein the setting device is configured to set the ID and wirelessly provide the ID to the first communication device.

15. The wheel information-acquiring system according to claim 12, wherein the second communication device is further configured to compare values included in the wheel information and target values stored in the second communication device.

16. The wheel information-acquiring system according to claim 15, further comprising a display installed in the motor vehicle for showing a result of the comparison of the values.

17. The wheel information-acquiring system according to claim 12, wherein the wheel information further includes a temperature of the wheel.

18. The wheel information-acquiring system according to claim 17, further comprising a pressure sensor and a temperature sensor installed in the wheel which are connected to the first communication device.

19. The wheel information acquiring system according to claim 12, further comprising another first communication device provided in another wheel installed on the motor vehicle and another second communication device communicating with the other first communication device and the setting device, wherein the other first communication device and the second communication device have the same configurations as the first communication device and the second communication device.

* * * * *

UNITED STATES PATENT AND TRADEMARK OFFICE
CERTIFICATE OF CORRECTION

PATENT NO. : 7,577,500 B2  Page 1 of 1
APPLICATION NO. : 10/553043
DATED : August 18, 2009
INVENTOR(S) : Nihei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,577,500 B2
APPLICATION NO. : 10/553043
DATED : August 18, 2009
INVENTOR(S) : Hideki Nihei et al.

Page 1 of 1

It is certified that error appears in the above-identified patent and that said Letters Patent is hereby corrected as shown below:

Page 1, Column 1, Assignee: after "The Yokohama Rubber Co., Ltd., Tokyo (JP)", insert
-- Fuji Electric Systems, Co., Ltd., Tokyo (JP) --

Signed and Sealed this
Fourteenth Day of June, 2011

David J. Kappos
*Director of the United States Patent and Trademark Office*